United States Patent
Anderson et al.

(10) Patent No.: US 11,461,616 B2
(45) Date of Patent: Oct. 4, 2022

(54) METHOD AND SYSTEM FOR ANALYZING DOCUMENTS

(71) Applicants: Eric Anderson, Westfield, NJ (US); Robert Schiele, Munich (DE); Detlef Schuetz, Zorneding (DE)

(72) Inventors: Eric Anderson, Westfield, NJ (US); Robert Schiele, Munich (DE); Detlef Schuetz, Zorneding (DE)

(73) Assignee: Siemens Aktiengesellschaft, Munich (DE)

( * ) Notice: Subject to any disclaimer, the term of this patent is extended or adjusted under 35 U.S.C. 154(b) by 602 days.

(21) Appl. No.: 16/531,762

(22) Filed: Aug. 5, 2019

(65) Prior Publication Data

US 2021/0042515 A1 Feb. 11, 2021

(51) Int. Cl.
*G06N 3/04* (2006.01)
*G06N 20/00* (2019.01)
*G06F 17/16* (2006.01)
*G06F 16/93* (2019.01)
*G06V 10/82* (2022.01)
(Continued)

(52) U.S. Cl.
CPC .............. *G06N 3/04* (2013.01); *G06F 16/93* (2019.01); *G06F 17/16* (2013.01); *G06N 3/0445* (2013.01); *G06N 20/00* (2019.01); *G06V 10/82* (2022.01); *G06F 9/54* (2013.01); *G06V 30/16* (2022.01); *G06V 30/40* (2022.01); *G06V 2201/10* (2022.01)

(58) Field of Classification Search
CPC ........ G06F 40/30; G06F 40/205; G06F 40/20; G06F 40/289; G06N 3/08; G06N 3/0445; G06N 3/04; G06N 5/00; G06N 5/02; G06N 5/022; G06N 3/0472; G06N 20/00; G06N 3/0454; G06N 3/088; G06K 9/6267; G06V 30/40; G06V 30/274

See application file for complete search history.

(56) References Cited

U.S. PATENT DOCUMENTS

2007/0073533 A1* 3/2007 Thione .................... G06F 40/35
704/9
2019/0129947 A1* 5/2019 Shin ........................ G10L 25/30
(Continued)

FOREIGN PATENT DOCUMENTS

CN 109101584 A * 12/2018 ............. G06F 17/30

*Primary Examiner* — Allahyar Kasraian
(74) *Attorney, Agent, or Firm* — Lempia Summerfield Katz LLC (57) ABSTRACT

A computer-implemented method used for analyzing documents by an artificial intelligence system is disclosed herein. The method includes uploading at least one document via a frontend which stores the document in a database of the artificial intelligence system; preprocessing at least one document retrieved from the database by splitting the document into individual sentences and calculating a word vector for each sentence of the document; assessing each sentence using a categorization model of the artificial intelligence system by processing the calculated word vector representing the sentence to provide a categorization prediction result; and processing positive categorized sentences in order to calculate an opinion prediction result and a sub-categorization prediction result for each positive categorized sentence based on an opinion prediction model and based on a sub categorization model of the artificial intelligence system.

18 Claims, 9 Drawing Sheets

(51) Int. Cl.
  *G06F 9/54* (2006.01)
  *G06V 30/40* (2022.01)
  *G06V 30/16* (2022.01)

(56) References Cited

U.S. PATENT DOCUMENTS

2020/0042583 A1* 2/2020 Wang .................. G06N 3/08
2020/0301672 A1* 9/2020 Li ....................... G06F 8/73
2021/0209551 A1* 7/2021 Navarra ............... G06F 16/93
2021/0342548 A1* 11/2021 Galitsky .............. G06F 40/30

* cited by examiner

| FIG 13A | FIG 13B |
|---|---|

FIG 13A

| Document Type | Category | Subcategory 1 | Subcategory 2 |
|---|---|---|---|
| Independent Engineering Report (IER) | Construction/ EPC | Performance Guarantee | Schedule/ Milestones/ Term/ Extension |
| | Operations & Maintenance | Performance Guarantee | Schedule/ Milestones/ Term/ Extension |
| | Offtaker/ Resource | Curtailment/ Transmission | Schedule/ Milestones/ Term/ Extension |
| | Curtailment/ Transmission/ Interconnection | Curtailment/ Transmission | Schedule/ Milestones/ Term/ Extension |
| | Technology | Performance Guarantee | Hardware Track Record |
| | Environmental/Permitting/ Lease | Permits/ Lease | Environment |
| | Supply | Data Source/ Generation | |
| | IE Opinion | Positive/ Neutral | Negative |
| Engineering, Procurement, Construction Agreement | Construction/ EPC | Cost Overrun | Schedule/ Milestones/ Term/ Extension |
| Operations & Maintenance Agreement | Operations & Maintenance | Performance Guarantee | Schedule/ Milestones/ Term/ Extension |
| Offtaker Agreement (PPA/ FIT) | Offtaker/ Resource | Curtailment/ Transmission | Schedule/ Milestones/ Term/ Extension |
| Interconnection Agreement | Curtailment/ Transmission/ Interconnection | Curtailment/ Transmission | Schedule/ Milestones/ Term/ Extension |

FIG 13B

| Subcategory 3 | Subcategory 4 | Subcategory 5 | Subcategory 6 | Subcategory 7 | Subcategory 8 | Subcategory 9 |
|---|---|---|---|---|---|---|
| Price/Escalation | LDs/Collateral/Liability Cap | Interface/Subcontractor | Track Record | Warranty | Termination/Default | Cost Overrun |
| Price/Escalation | LDs/Collateral/Liability Cap | Scope of Work/Services | Track Record | Warranty | Termination/Default | — |
| Price/Escalation | LDs/Collateral/Liability Cap | Min. Delivered Energy/Capacity Req. | Track Record | Data Source/Generation | Termination/Default | Change in law |
| Price/Escalation | LDs/Collateral/Liability Cap | Interconnection Point | Track Record | — | Termination/Default | — |
| Replaceability | LDs/Collateral/Liability Cap | — | Track Record | Warranty | — | — |
| — | — | — | — | — | — | — |
| Price/Escalation | LDs/Collateral/Liability Cap | Min. Delivered Energy/Capacity Req. | Track Record | — | — | — |
| — | — | — | — | — | — | — |
| Price/Escalation | LDs/Collateral/Liability Cap | Interface/Subcontractor | Track Record | Warranty | Termination/Default | — |
| Price/Escalation | LDs/Collateral/Liability Cap | Scope of Work/Services | Track Record | Warranty | Termination/Default | — |
| Price/Escalation | LDs/Collateral/Liability Cap | Min. Delivered Energy/Capacity Req. | Track Record | Data Source/Generation | Termination/Default | Change in law |
| Price/Escalation | LDs/Collateral/Liability Cap | Interconnection Point | Track Record | — | Termination/Default | — |

METHOD AND SYSTEM FOR ANALYZING DOCUMENTS

TECHNICAL FIELD

The disclosure relates to a computer-implemented method for analyzing documents by an artificial intelligence, AI, and machine learning, ML, system.

BACKGROUND

Any complex system or project is normally documented by a wide variety of different documents. These documents provide a wide range of legal and/or technical information concerning the respective system or project. These documents can include engineering reports providing technical information data for operations and maintenance agreements for industrial facilities. Electronic documents can be stored in a database for evaluation and/or analyzing of the facility or project. For a complex system, a high number of different documents can be stored in a central or distributed database. Documents can include, for example, text data, image data, and tables. In many use cases, it is necessary to analyze planned or existing systems, in particular, a technical system for performing operational acts within a project. A typical use case is the performance of a due diligence analysis concerning the system or project based on a plurality of available documents related to the system. Due diligence analysis can differ depending on its purpose. A due diligence analysis can relate to a legal, financial, commercial, or technology related situation of a company. Other possible areas for performing a due diligence analysis include intellectual property as well as real and personal property of a company. In a conventional due diligence framework, a plurality of different documents concerning a specific system or project have to be selected and manually reviewed and analyzed by a due diligence evaluation team. Due diligence is normally performed by at least two different analysts to avoid to some extent that a subjective perception of an individual analyst has a too strong impact on the result of the due diligence process.

Accordingly, in a conventional due diligence framework the process of performing the due diligence of the basis of a plurality of different documents is extremely time consuming, cumbersome, and potentially error-prone. Moreover, the result of a due diligence process performed in a conventional due diligence framework provides a subjective result depending on the individual assessment of the documents by the analysts of the due diligence analyzing team.

Accordingly, there is a need to provide a method and a system for analyzing documents in a more automated manner to provide more objective and accurate due diligence results. Further, there is a need to provide a method and system for analyzing a plurality of documents in less time to get a due diligence result more rapidly.

BRIEF SUMMARY AND DESCRIPTION

The scope of the present disclosure is defined solely by the appended claims and is not affected to any degree by the statements within this summary. The present embodiments may obviate one or more of the drawbacks or limitations in the related art.

The disclosure provides according to a first aspect a computer-implemented method for analyzing documents by an artificial intelligence system, wherein the method includes the acts of: uploading at least one document via a frontend which stores the document in a database of the artificial intelligence system; preprocessing at least one document retrieved from the database by splitting the document into individual sentences and calculating a word vector for each sentence of the document; assessing each sentence using a categorization model of the artificial intelligence system by processing the calculated word vector representing the sentence to provide a categorization prediction result; and processing the positive categorized sentences in order to calculate an opinion prediction result and a subcategorization result for each positive categorized sentence based on an opinion prediction model and based on a subcategorization prediction model of the artificial intelligence system.

The subcategorization model and the opinion prediction model are applied only to sentences which have been categorized by the categorization model.

In an embodiment, the document is analyzed by evaluating the categorization prediction results, the sub-categorization prediction results and the opinion prediction results.

This provides the advantage that the categorization predication results, the sub-categorization prediction results and the opinion prediction results can be processed to provide automatically or semi-automatically an analytical result reflecting the relevance of a sentence within a document of interest with respect to a category and/or sub-category in a due diligence process.

In an embodiment of the computer-implemented method according to the first aspect, concatenated meta data is added to text data of the document during the upload of the document in the database.

This has the advantage that the investigated document can be enriched with meta data to enhance the analytical result.

In a further embodiment of the computer-implemented method according to the first aspect, the added meta data includes document-related meta information such as a document type, a technology type and/or a region.

The added meta information improves the quality of the analysis result of the respective document.

In a still further embodiment of the computer-implemented method according to the first aspect, a prediction application programming interface is triggered by the frontend to calculate the categorized prediction result, the subcategorization prediction result and the opinion prediction result.

This provides the advantage that the calculation of the prediction results can be performed automatically for the sentences of the document in response to the received trigger.

In a further embodiment of the computer-implemented method according to the first aspect, text data and added meta data are loaded into the prediction application programming interface.

This provides the advantage that the required data for performing the calculation of the prediction result can be loaded automatically for further processing.

In a further embodiment of the computer-implemented method according to the first aspect, the categorization prediction results, the sub-categorization prediction results, and the opinion prediction results are stored at least temporarily in the database of the artificial intelligence system and/or in a local memory of the user terminal.

This provides the advantage that the prediction results can be used for further processing and analysis of other requested documents.

In a further embodiment of the computer-implemented method according to the first aspect, the categorization model, the sub-categorization model, and the opinion prediction model include an input layer to receive the calculated word vector of the sentence and an input layer for any added document-related meta information.

This has the advantage that a trained neural network can be used for further processing of the preprocessed sentence of a document.

In a further embodiment of the computer-implemented method according to the first aspect, the categorization model further includes for each input layer an associated embedding layer which maps the input data of the input layer to provide an embedded vector.

Embedding does reduce the dimensionality of categorical variables and that categories can be represented in a transformed space with a lower dimension.

In a further embodiment of the computer-implemented method according to the first aspect, the categorization model includes a layer normalization layer which normalizes the embedded vector calculated by the embedded layer associated with the input layer receiving the word vector of the sentence across its features.

The advantage of the provision of a layer normalization layer is that covariant shift is avoided or at least reduced.

In a further embodiment of the computer-implemented method according to the first aspect, the categorization model includes a bidirectional gated recurrent unit, GRU, layer including gated recurrent units connected to the layer normalization layer to provide a vector applied to an attention layer of the categorization model.

The provision of a gated recurrent unit GRU, layer allows to capture temporal dynamic behavior in a sequence.

In a further embodiment of the computer-implemented method according to the first aspect, in the categorization model, the sub-categorization model, and in the opinion prediction model, the embedded vectors calculated by the embedding layers associated with the input layers for the document-related meta information are concatenated by a first concatenation layer to provide a first concatenation vector supplied to a dropout layer. The provision of a dropout layer reduces overfitting.

In a still further embodiment of the computer-implemented method according to the first aspect, in the categorization model, an output vector of the attention layer and an output vector of the dropout layer of the categorization model are concatenated by a second concatenation layer of the categorization model to provide a second concatenation vector which is supplied to a dense layer of the categorization model connected to an activation layer which applies an activation function to the output of the dense layer to calculate the categorization prediction result.

The provision of an attention layer has the advantage that it allows to put attention to specific words within the processed sentence.

In a further embodiment of the computer-implemented method according to the first aspect, the opinion prediction model and the sub-categorization model includes a bidirectional gated recurrent unit layer, GRU, including gated recurrent units to provide a vector concatenated by a second concatenation layer of the opinion prediction model, the sub-categorization model to provide a second concatenated vector which is supplied to a dense layer of the opinion prediction model, or the sub-categorization model connected to an activation layer which applies an activation function to the output of the dense layer to calculate the opinion prediction result and/or a sub-categorization result for the respective sentence.

The provision of an activation layer allows to apply an activation function to calculate the opinion prediction result or sub-categorization prediction result.

In a further embodiment of the computer-implemented method according to the first aspect, the sentence is annotated on the basis of the calculated categorization predication result and/or the sub-categorization prediction result and output in annotated form via a user interface of the artificial intelligence system.

By outputting a sentence of a requested document in annotated form, it is possible for a user to focus on the most relevant portions of the investigated document.

In a further embodiment of the computer-implemented method according to the first aspect, the categorization model, sub-categorization model, and the opinion prediction model are trained in a machine learning process.

The categorization model, the sub-categorization model, and the opinion prediction model can be automatically trained in a machine learning process in a supervised manner so that programming efforts can be minimized.

The disclosure further provides according to a further second aspect an artificial intelligence, AI, system including: a frontend configured to upload at least one document and to store it in a database of the artificial intelligence system; and a prediction module configured to preprocess at least one document retrieved from the database of the artificial intelligence system by splitting the retrieved document into individual sentences and to calculate a word vector for each sentence of the document, wherein the prediction module is further configured to assess each sentence using a categorization model of the artificial intelligence system by processing the calculated word vector representing the sentence to provide a categorization prediction result to review the positive categorized sentences in order to calculate an opinion prediction result and a sub-categorization prediction result for each positive categorized sentence based on an opinion prediction model and based on a separate sub-categorization model of the artificial intelligence system.

BRIEF DESCRIPTION OF THE FIGURES

In the following, possible embodiments of the different aspects of the present disclosure are described in more detail with reference to the enclosed figures.

DETAILED DESCRIPTION

Figure 1:
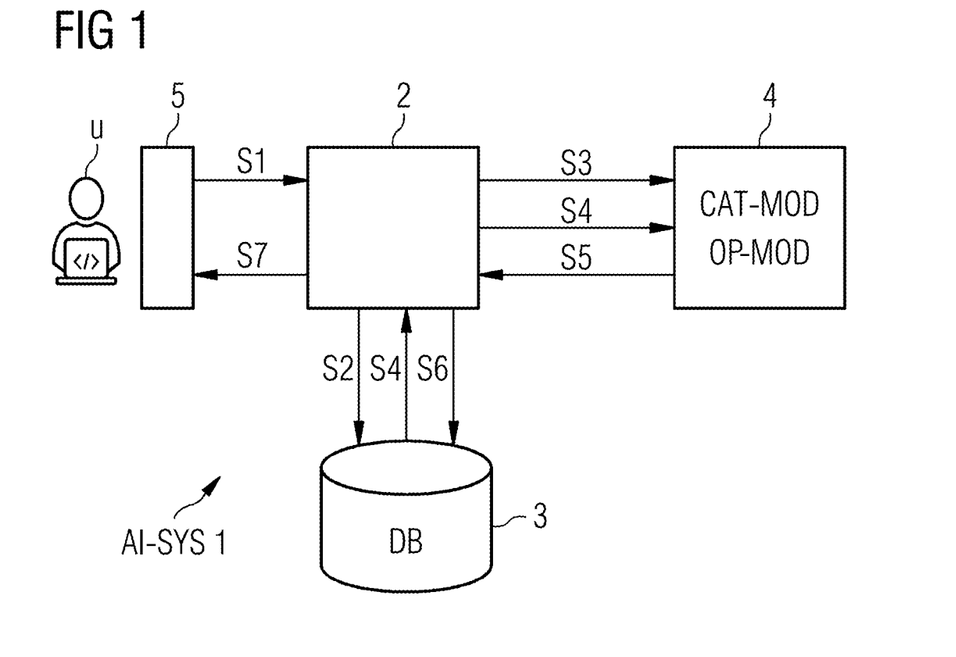
FIG. 1 shows a block diagram of a possible exemplary embodiment of an artificial intelligence, AI, system.
Figure 4:
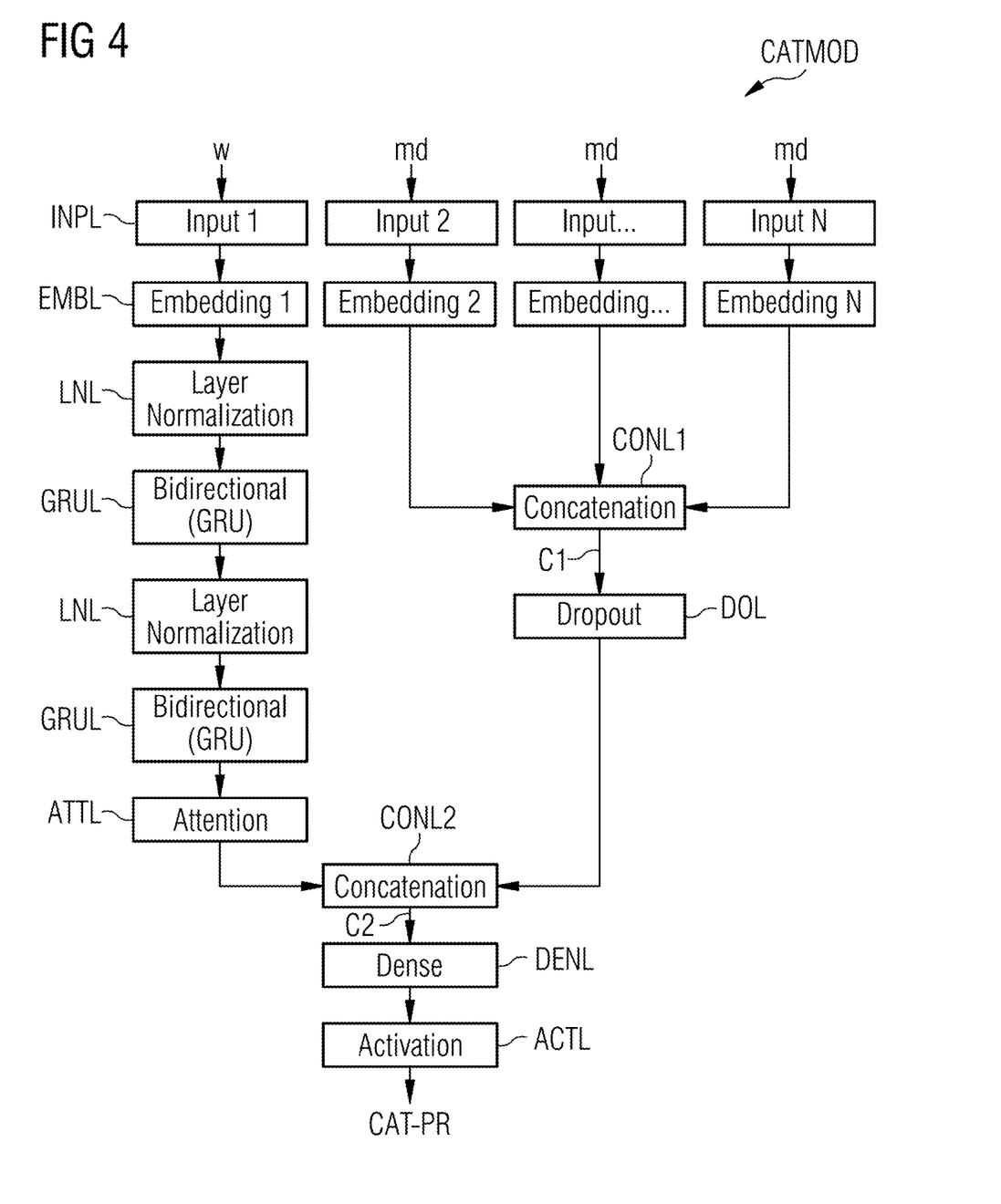
FIG. 4 shows a diagram for illustrating a possible exemplary embodiment of a categorization model used by an artificial intelligence system to calculate a categorization predication result.
Figure 5:
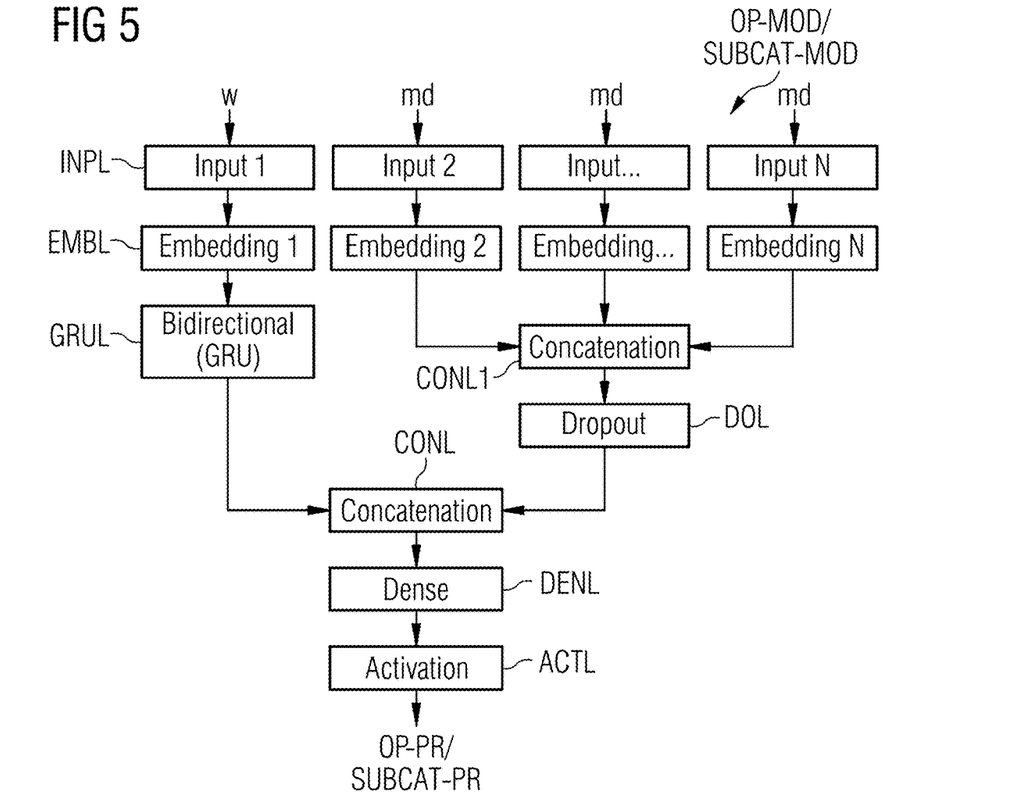
FIG. 5 shows a schematic diagram of a possible exemplary embodiment of an opinion prediction model used in the artificial intelligence system to calculate an opinion prediction result and a sub-categorization model used in the artificial intelligence system to calculate a sub-categorization prediction result.

FIG. 1 illustrates a possible system architecture of an artificial intelligence system 1 according to an aspect of the present disclosure. In the illustrated embodiment, the artificial intelligence system 1 includes a frontend 2 configured to upload at least one document D to store the document D in a database 3 of the artificial intelligence, AI, system 1. The frontend application can be implemented on a web server. The AI system 1 of FIG. 1 includes a prediction module 4 connected to the frontend 2. In a possible embodiment, the prediction module 4 is configured to preprocess at least one document D retrieved from the database 3 of the artificial intelligence system 1 by splitting the retrieved document D into individual sentences s and to calculate a word vector w for each sentence s of the respective document D. The prediction module 4 is further configured to assess each sentence s using a categorization model CAT-MOD as shown in FIG. 4 and a sub-categorization model SUBCAT-MOD of the artificial intelligence, AI, system 1 as shown in FIG. 5. The sub-categorization model SUBCAT-MOD is only applied to sentences having been positively categorized by the categorization model CAT-MOD. The word vector w representing the sentence s is processed to provide a categorized predication result CAT-PR and a sub-categorization prediction result SUBCAT-PR and to review the categorized sentence s in order to calculate an opinion prediction result OP-PR based on an opinion prediction model OP-MOD used by the artificial intelligence, AI, system 1. An exemplary embodiment of an opinion prediction model OP-MOD is illustrated in FIG. 5. In this embodiment, the used opinion prediction model OP-MOD is the same as the sub-categorization model SUBCAT-MOD. An opinion prediction result OP-PR is not calculated for each categorized sentence but only for those sentences s that fall into the relevant categories/sub-categories. The sub-categorization model SUBCAT-MOD and the opinion prediction model OP-MOD are applied to each positive CAT-MOD prediction. The calculated categorization predication result, CAT-PR, the calculated sub-categorization predication result, SUBCAT-PR and the opinion prediction result, OP-PR, of the sentence s can be stored in a possible embodiment also in the database 3 of the artificial intelligence system 1. The artificial intelligence system has a user interface UI configured to display the positive categorized sentences belonging to selected relevant categories and/or sub-categories in annotated form. In a possible embodiment, a user can upload documents and select model(s) best aligned to due diligence objective, which will activate the appropriate category, subcategory, and opinion prediction models. Depending on a type or purpose of a due diligence process, the relevant categories and/or sub-categories can be trained by the AI system 1, e.g., by a mapping table. In a possible embodiment, an analyzing module can be configured to process the document D by evaluating the categorization predication results CAT-PR, the sub-categorization predication results SUBCAT-PRs and the opinion prediction results OP-PR provided for the sentence s of the document D, e.g., to provide aggregated metrics of the respective document D.

During upload of the document D by the frontend 2 in act S1, meta data md can be added to text data of the uploaded document D. The meta data md can be stored in act S2 along with the text data of the document D in the database 3 of the artificial intelligence system 1. Meta data md can include in a possible embodiment document-related concatenated meta information including for instance a document type, a technology type, and/or a region of the document D. In a possible embodiment, the document D can be uploaded by a user via a user interface UI of a terminal device 5 linked to the frontend 2 of the artificial intelligence system 1. In the illustrated embodiment of FIG. 1, the frontend application and the prediction module 4 are implemented on different web servers connected with each other by a data network. In a possible alternative embodiment, the prediction module 4 can also be implemented in the frontend 2 of the artificial intelligence system 1. A user terminal 5 can be connected via a wired or wireless link to the frontend 2 of the artificial intelligence system 1. The database 3 of the artificial intelligence system 1 as illustrated in FIG. 1 can include a central database 3 connected via a network to the frontend 2. In a further possible embodiment, the database 3 can include a decentralized distributed database. The user terminal 5 can include a graphical user interface GUI for displaying documents D in annotated form to the respective user U. The user interface UI of the user terminal 5 can be used to upload one or more documents D from a memory of the user terminal 5 to the frontend 2. During the upload process, the user interface UI of user terminal 5 can further be used to add meta information concerning the uploaded document D. A display of the graphical user interface GUI of the user terminal 5 can be used to view prediction results concerning required categories/sub-categories in a requested document D stored in the database 3 of the artificial intelligence system 1.

In a possible embodiment, a prediction application programming interface can be triggered in act S3 by the frontend 2 to calculate a categorization predication result CAT-PR and/or a sub-categorization result SUBCAT-PR and an opinion prediction result OP-PR for a sentence s of a document D requested by the user. In a possible embodiment, the prediction module 4 implemented on a web server of the artificial intelligence system 1 has access to a categorization model CAT-MOD/sub-categorization model SUBCAT-MOD as illustrated in FIG. 4 and to an opinion prediction model OP-MOD as illustrated in FIG. 5. In a possible embodiment, both text data and added meta data of a requested document D can be loaded in act S4 into the prediction application programming interface P-API triggered by the frontend 2. In an embodiment, the prediction module 4 can perform a preprocessing of a selected document D retrieved from the database 3 or uploaded from the user terminal 5. In a possible embodiment, the document D is first split into individual sentences s and a word vector w is calculated for each sentence s of the document D. The prediction module 4 is configured to assess each sentence s using the categorization model CAT-MOD/sub-categorization model SUBCAT-MOD by processing the calculated word vector w representing the sentence s to provide a categorization predication result CAT-PR and/or a sub-categorization predication result SUBCAT-PR. The sub-categorization model SUBCAT-MOD is only applied for positive categorized sentences, e.g., sentences having been positively categorized by the categorization model CAT-MOD. A sub-category prediction result SUBCAT-PR is calculated by the sub-categorization model SUBCAT-MOD for all sentences that have a CAT prediction provided by the categorization model CAT-MOD. The opinion prediction model OP-MOD is independent from the sub-categorization model SUBCAT-MOD (even though they may have the same structure). An opinion (e.g., predication result) is calculated for all categorized sentences, e.g., all sentences that include a CAT prediction (CAT-PR). The prediction module 4 can review positive categorized sentences s to calculate an opinion prediction result OP-PR based on the opinion prediction model OP-MOD used by the artificial intelligence system 1 for these relevant sentences. The prediction module 4 does also calculate a categorization prediction result CAT PR and a sub-categorization prediction result SUB CAT PR as described above In a possible embodiment the predication module 4 can return in act S5 the calculated categorization predication results CAT-PRs, the calculated sub-categorization predication results SUB-CAT-PRs and the calculated opinion prediction results OP-PRs of the positive categorized sentences s of the requested document D back to the frontend 2 of the artificial intelligence system 1 as illustrated in FIG. 1. The categorization prediction results CAT-PR, the sub-categorization predication results SUBCAT-PRs, and the opinion prediction results OP-PR can be stored in a possible embodiment in act S6 in relation to the respective sentences s in the database 3 of the artificial intelligence, AI, system 1 and/or in a local memory of the user terminal 5.

In a possible embodiment, the preprocessing of the text data of the requested document D can be performed in the predication module 4 implemented on a web server of the artificial intelligence system 1. In a further possible embodiment, the preprocessing of the text data can also be performed in the frontend 2 of the artificial intelligence system 1. In a still further possible alternative embodiment, preprocessing of the document D can also be performed by a text processing unit of the user terminal 5.

The document D can include raw data including text data. In a possible implementation, raw data of the respective document D can be preprocessed by first splitting raw data into sentences s (nitk.sent_tokenize). Then, in a further preprocessing act, unicode errors can be fixed (ftfy-fix text). In a still further preprocessing act, specific text with pre-defined tokens, (e.g., date, number and percentage), can be replaced by specific text (nlp.pipe). In a further preprocessing act, all characters can be replaced and converted to a lower case (genism.simplepreprocess). In a possible embodiment, sentences s are only split if they are longer than a predetermined number of words, for instance, longer than 60 words. Further, during the preprocessing sentences s having less than a predefined number of words such as sentences having less than 5 words can be automatically dropped. For each split sentence s of the document D, a word vector w can be calculated. Text embedding can be performed by using a word2vec model. This word2vec model can be trained on sample documents and on the domain-specific Wikipedia articles available in the internet or other sources (e.g., market studies). Every word can be converted into a vector with a fixed dimension. The prediction model can encompass a categorization model CAT-MOD, sub-categorization model SUBCAT-MOD, and an opinion prediction model OP-MOD. The input of the prediction model can include a matrix of the size defined as a sentence length SL of the sentence s x word2vec vector dimension. In a possible embodiment, words which are not present in the word2vec model can be skipped to shorten the sentence s. Every sentence can be padded with 0 if it is shorter than the predetermined expected sentence length SL. In a possible embodiment, the processed documents D can include pdf documents uploaded to the web frontend 2 of the artificial intelligence system 1. Meta information like region, document type, or technology type can be added during the upload process in act S1. In a possible implementation, the meta data and can be added manually by a user using the user interface UI of the user terminal 5. In a further embodiment, the meta information is at least partially added automatically depending on available information such as the geolocation of the user terminal 5 and/or the language of the document D. Further, format descriptions of electronic documents D can be used to derive automatically meta information concerning the respective document. The document format can include .DOC, .XLS, .MDB, .PDF, and/or .JPEG. These document formats are only examples and the AI system 1 can be used for any kind of document formats of electronic document D. The uploaded document D can also include a document type definition DTD. The document type definition DTD includes a set of marking declarations that can define a document type for a SGML family markup language such as GML, SGML, XML, or HTML.

Figure 2:
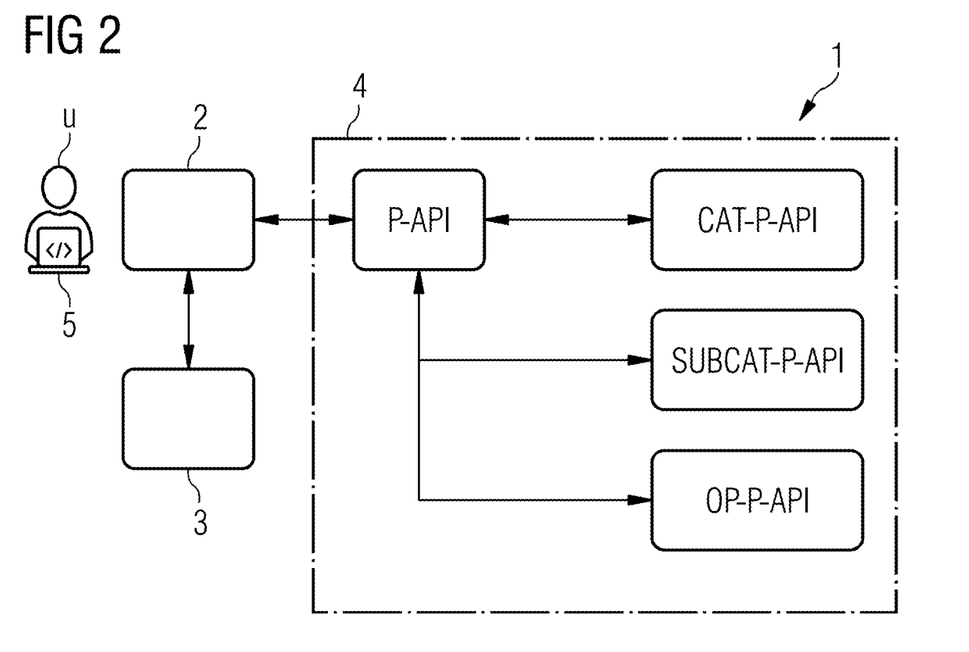
FIG. 2 shows a block diagram of a possible exemplary embodiment of a system architecture of an artificial intelligence system.

FIG. 2 illustrates a possible exemplary system architecture of the artificial intelligence system 1 shown in the embodiment of FIG. 1. The prediction application programming interface API is triggered by the frontend 2, in particular, a web frontend 2, to calculate a categorization predication result CAT-PR, a sub-category prediction result SUBCAT-PR, and an opinion prediction result OP-PR, for a preprocessed sentence of a requested document D. The prediction application programming interface P-API loads the raw data of the document D, (e.g., the text data and the meta data), to initiate the preprocessing and to start a category prediction API (CAT-P-API) using the categorization model CAT-MOD. In a possible implementation, the text data preprocessing can also be performed by the category prediction API. The sentences s of the document D can be used as input for the category prediction API (CAT-P-API). Only results of positive categorized sentences are returned in a possible implementation by the category prediction API (CAT-P-API) to the prediction API (P-API) implemented in the prediction module 4 of the artificial intelligence system 1. Only the positive categorized sentences s are then used as input for a sub-category prediction API (SUBCAT-P-API) and/or for an opinion prediction API (OP-P-API). The sub-category prediction API can, in a possible implementation, perform a sentence preprocessing. The opinion prediction API can also, in a possible embodiment, perform a sentence preprocessing and can be used to calculate an opinion prediction result OP-PR based on an opinion prediction model OP-MOD. The prediction API (P-API) can combine automatically the results returned by the category prediction API, the sub-category prediction API, and the opinion prediction API. In a further possible embodiment, the combined results including the opinion prediction results and the category prediction results can be evaluated to analyze the document D and/or to annotate positive categorized sentences s within the processed document D. In a possible embodiment, sentences of the document D are annotated on the basis of the associated calculated categorization prediction result and/or sub-categorization prediction result and output in annotated form via the user interface UI of the user terminal 5 to the user U. The prediction API (P-API) can return the annotations to the user interface UI of the user U. In a possible embodiment, the categorization model CAT-MOD, the sub-categorization models SUB-MODs, and the opinion prediction model OP-MOD can be trained in a machine learning ML process. For example, one can implement a machine learning ML process for training the data models. A cloud-based or on-premise server solution can be used as a machine learning ML infrastructure. A cloud-based or on-premise server solution can be used as a storage for model artefacts and storage of training data. In a possible embodiment of the artificial intelligence system 1 as illustrated in the schematic block diagram of FIG. 1, storage as a service solution can be used as a hosting infrastructure for the web frontend 2 and the prediction pipeline 4. Further, machine learning ML infrastructure as a service can be used for training the categorization CAT-MOD, the sub-categorization models SUBCAT-MODs and/or the opinion prediction model OP-MOD used by the prediction pipeline of the prediction module 4 of the artificial intelligence system 1.

Figure 3:
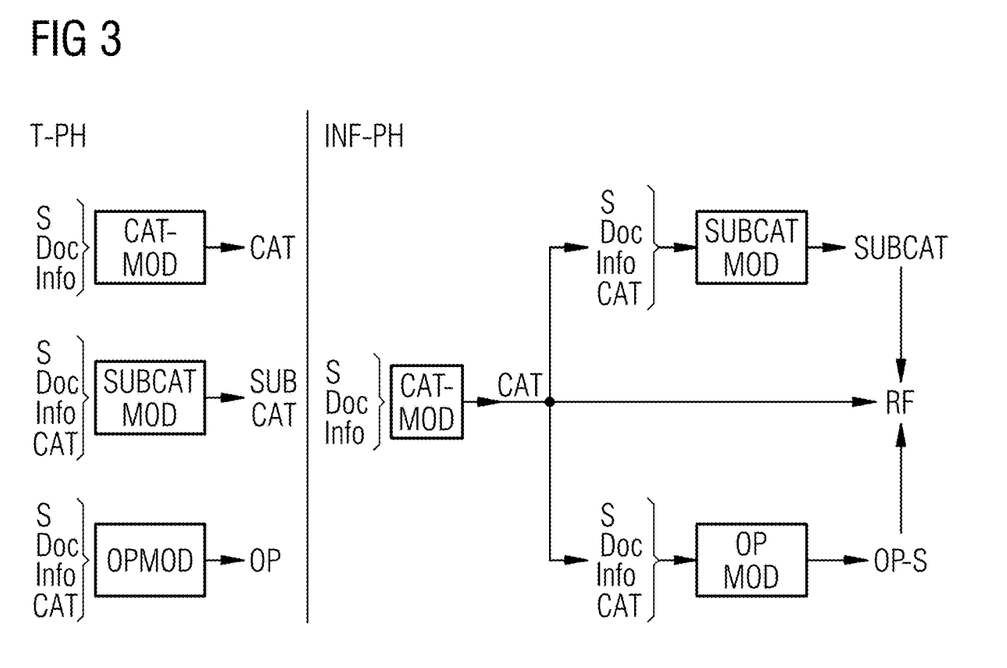
FIG. 3 shows schematically the process of training and using an artificial intelligence system.

FIG. 3 illustrates schematically a process flow for multiple model prediction. A categorization model CAT-MOD and/or a sub-categorization model SUBCAT-MOD and/or the opinion prediction model OP-MOD can be used by the category prediction API, the sub-category prediction API, and the opinion prediction API illustrated in FIG. 2 and can be trained in a training phase T-PH in a machine learning ML process on the basis of training data. After training of the models has been completed during the training phase T-PH, the categorization model CAT-MOD can be used in a first stage of an inference phase INF-PH to calculate a categorized predication result CAT-PR applied to a sub-categorization model SUBCAT-MOD and to the opinion prediction model OP-MOD along with the raw data and the meta data and (DOC info) to get an opinion prediction result OP-PR for each sentence s as an opinion sentiment OP-S. Further, the sub-categorization model SUBCAT-MOD provides in a possible embodiment a sub-category as a further categorization result. In a possible embodiment, the resulting category calculated by the category model CAT-MOD as a categorization prediction result CAT-PR, the opinion prediction result OP-PR provided by the opinion prediction model OP-MOD and the sub-category provided by the sub-category model SUBCAT-MOD can be further processed to get a final result including for instance a risk factor RF expressed by the respective sentence s within the processed document D. For instance, a specific sentence s within an independent engineering report IER of the category IE opinion can carry information concerning a potential risk of a technical system or project. These evaluation details can be displayed to a user U via a user interface UI of the user terminal 5 indicating different levels for different kinds of risks such as operation risks. A positive categorized sentence s within the processed document D can include a negative sentiment indicating a potential risk. For example, within an independent engineering report IER concerning a technical system a sentence S of the category IE opinion may be: "Instead, we would expect major maintenance funds to be utilized after the warranty period, and during that warranty period, we typically see major maintenance costs trend upward over time". Such a sentence s within a document D leads to a high value for the calculated risk factor RF and can be used to label the respective sentence s. In a possible embodiment, the sentence s can be annotated on the basis of the calculated risk factor RF for instance by color coding the sentence displayed on a screen of the user interface UI of the user terminal 5. For instance, if a sentence s has a negative opinion sentiment expressing a high potential risk, it can be color coded in red when displayed on the user interface UI on the user terminal 5. In a possible embodiment, by selecting or clicking on the displayed sentence s, the user U can receive more detailed information concerning potential risks expressed by the color coded sentence. By selecting a color coded sentence, a user U can get more detailed information about the sentence s, in particular, the calculated categorization prediction result, sub-categorization prediction result, and the calculated opinion prediction result for the respective sentence s. A sentence s having a low risk factor value can be for instance displayed without color coding or using a green color. A sentence s having a high risk factor value can be for instance displayed in red color. Accordingly, a user U when reading a document D can immediately focus on the most relevant portions of the investigated document D carrying the most critical sentiments. In a possible embodiment, the calculated categorization prediction results and the opinion prediction results for the different sentences s of the document D can be further processed to provide an aggregated result for all sentences s of the analyzed document D. The aggregated result can reflect the relevance of the document D within a due diligence process. This document relevance value can be used in a possible embodiment for filtering documents D related to a specific system or project in a complete due diligence process. Accordingly, in a possible embodiment only the most relevant documents D with respect to a selected due diligence task or due diligence type are processed in the due diligence framework.

The artificial intelligence system 1 can use one or more categorization models and opinion prediction models.

FIG. 4 shows an exemplary implementation of a possible categorization model CAT-MOD used in an artificial intelligence system 1.

FIG. 5 shows schematically a possible embodiment of an opinion prediction model OP-MOD and/or of a sub-category categorization model SUBCAT-MOD which can be used by an artificial intelligence system 1. The structure of the different layers L within the used models can vary depending on the use case.

As can be seen from FIGS. 4 and 5, the categorization model CAT-MOD as shown in FIG. 4 and the opinion prediction model OP-MOD /sub-categorization model SUBCAT-MOD as shown in FIG. 5 both include an input layer INPL1 to receive the calculated word vector w of a sentence s within the text data of the requested document D and input layers INPL2 to INPLN for any added document-related meta information. The categorization model CAT-MOD shown in FIG. 4 and the opinion prediction model OP-MOD/sub-categorization model SUBCAT-MOD illustrated in FIG. 5 include for each input layer INPL an associated embedding layer EMBL which embed the input data of the input layer INPL to provide an embedded vector e as shown in FIGS. 4, 5. Accordingly, the used models perform both sentence embedding as well as meta data embedding. A word2Vec model can be used for performing the sentence embedding. Input layers INPL form the starting points for loading the data into the categorization model, the sub-categorization model and into the opinion prediction model. Each input layer INPL wraps the input data into a data object which can be used and processed by the respective model.

The embedding layer EMBL can convert in a possible embodiment index-based input data into an embedded vector e with a fixed size having values from a predefined vocabulary. In a possible implementation, the vocabulary can be either a one hot encoded vector or a vector from a word2vec model. The one hot encoded vector can for instance list regions such as Europe, America, and Asia as follows:
Europe=[1,0,0],
America=[0,1,0], and
Asia=[0,0,1].

In the word2vec model, each word can be represented by a vector of n float values. For instance, the word "contract" can be represented as [0.2782, 0.6023, . . . , 0.16869, −0.071599].

The embedding can include a mapping of a discrete categorical variable to a vector of continuous numbers. The embeddings can include low dimensional, learned continuous vector representations of discrete variables. Embedding is useful because it can reduce the dimensionality of categorical variables and can meaningfully represent categories in a transformed space. The operation of one hot encoding categorical variables is a simple embedding where each category is mapped to a different vector. This process can take discrete entities and map an observation to a vector having 0s and a single 1 signaling the specific category as exemplified above. The one hot encoding information does not rely on any supervision. It is possible to improve embeddings by learning a neural network on a supervised task. The resulting embedding vectors e form representations of categories where similar categories are closer to one another. Embedding is a technique where words or phrases from a vocabulary are mapped to vectors of real numbers. It involves a mathematical embedding from a space with many dimensions per word to a continuous vector space which a lower dimension. Word2vec is a model that can be used to produce word embeddings. Word2vec model can include a shallow layer neural network and can be trained to reconstruct linguistic contexts of words. Word2vec can take as an input a large corpus of text and can produce a vector space. This vector space can include several hundred dimensions and each unique word corpus can be assigned to a specific vector in the vector space. The vectors can be positioned in the vector space such that words that share common context in the corpus are located in close proximity with one another in the vector space.

As can be seen in the diagram of FIG. 4, the categorization model CAT-MOD includes a layer normalization layer LNL which can be used to normalize the embedded vector e calculated by the embedded layer EMBL1 associated with the input layer INPL1 receiving the word vector w of the sentence s across its features. In a batch layer, normalization statistics are computed across each feature and are independent of other examples in the batch. The layer normalization layer LNL can be used in a possible embodiment to normalize some input values based on the mean and variance of the layer. The layer normalization layer LNL can be used to avoid covariant shift.

$$\mu_i = \frac{1}{m} \sum_{j=1}^{m} x_{ij}$$

-continued $$\sigma_i^2 = \frac{1}{m} \sum_{j=1}^{m} (x_{ij} - \mu_i)^2$$

$$\hat{x}_{ij} = \frac{x_{ij} - \mu_i}{\sqrt{\sigma_i^2 + \epsilon}}$$

wherein $x_{ij}$ includes the i,j elements of the input, the first dimension represents the batch and the second dimension represents the respective feature.

Figure 6:
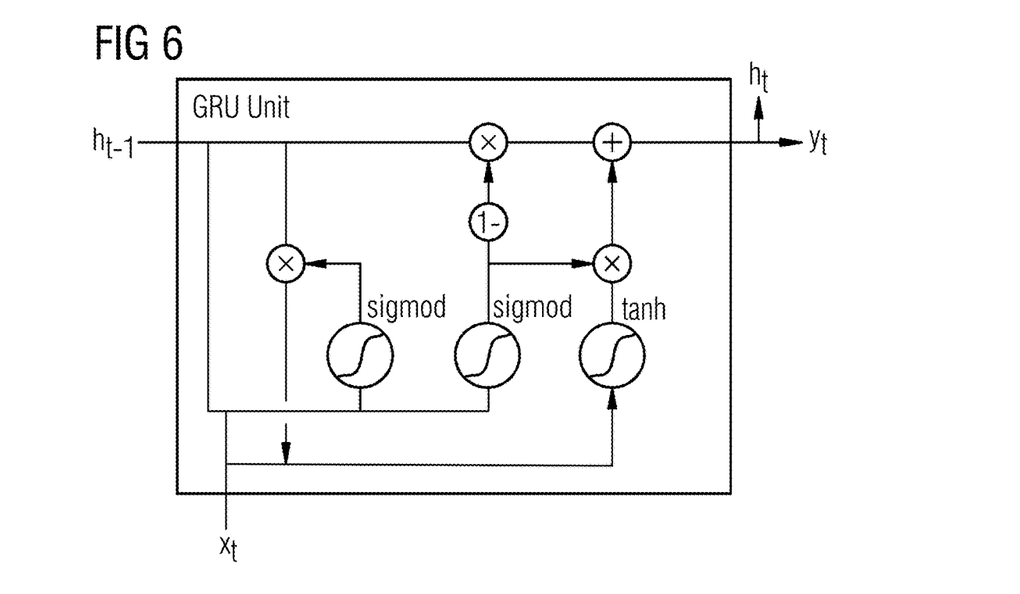
FIG. 6 shows a diagram for illustrating a possible exemplary embodiment of a gated recurrent unit of a gated recurrent unit layer within the categorization model illustrated in FIG. 4 and in the opinion prediction model illustrated in FIG. 5.
Figure 7:
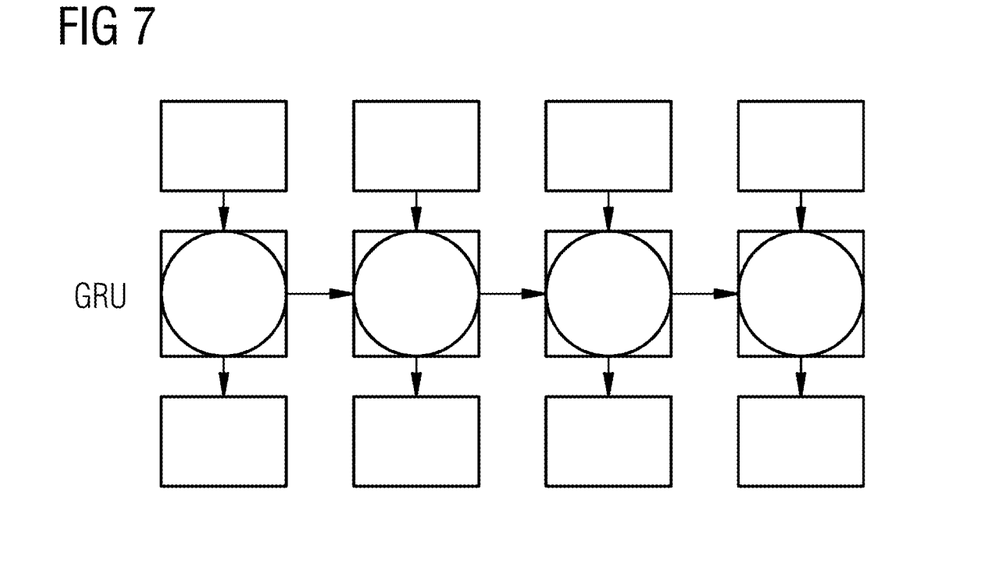
FIG. 7 shows a schematic diagram for illustrating a unidirectional GRU layer.
Figure 8:
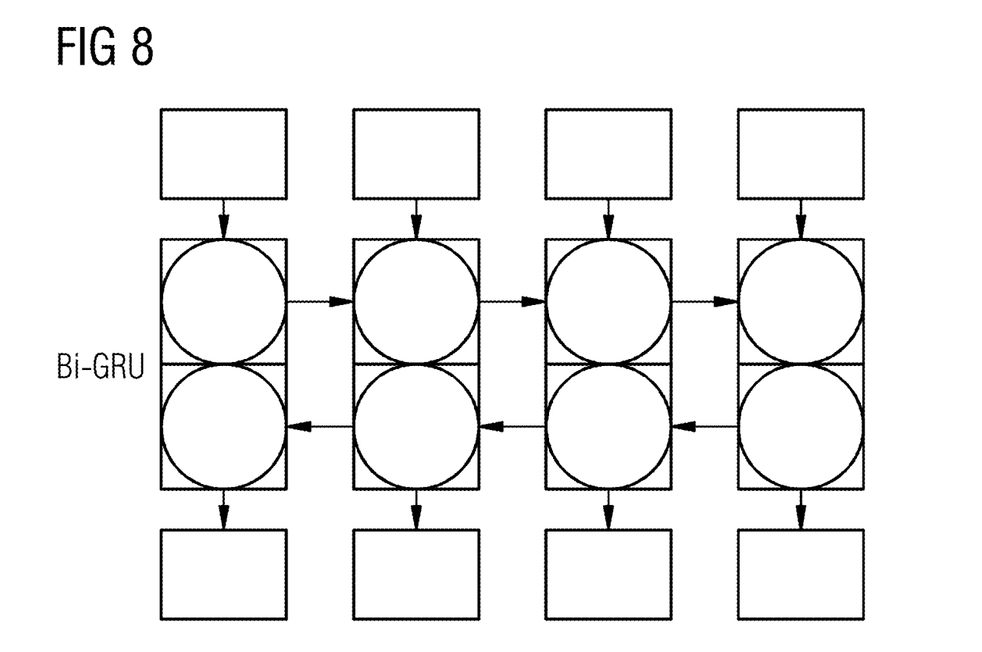
FIG. 8 shows a schematic diagram for illustrating a bidirectional GRU layer.

As can be seen in FIG. 4 the categorization model CAT-MOD includes at least one bidirectional gated recurrent unit, GRU, -layer GRUL which includes gated recurrent units GRUs connected to the layer normalization layer LNL to provide a vector applied to an attention layer ATTL of the categorization model CAT-MOD. In the illustrated exemplary implementation of FIG. 4, the categorization model CAT-MOD includes two stages of layer normalization layers LNL and gated recurrent unit GRU, layers GRUL. In an embodiment, the gated recurrent unit, GRU, layer GRUL includes a bidirectional GRU layer as also illustrated schematically in FIG. 8. In an alternative embodiment, the simple unidirectional GRU layer GRUL can be used as well as illustrated in FIG. 7. FIG. 6 illustrates a single gated recurrent unit GRU within a GRU layer. The GRU unit as shown in FIG. 6 can be connected with other identical GRU units in a unidirectional GRU layer as shown in FIG. 7 or in a bidirectional GRU layer as illustrated in FIG. 8. The use of a bidirectional GRU layer as shown in FIG. 8 has the benefit that sentences s can be analyzed from front to back and vice versa. Other elements such as long short term memory LSTM units can be used in an alternative implementation. The gated recurrent unit GRU as illustrated in FIG. 6 includes a gating mechanism within a recurrent neural network. The bidirectional layer as illustrated in FIG. 8 can use a sequence to predict or label each element of a sequence based on the element's past and future contexts. This can be done by concatenating outputs of two RRNs, one processing the sequence from the left to right and the other from right to left.

Figure 9:
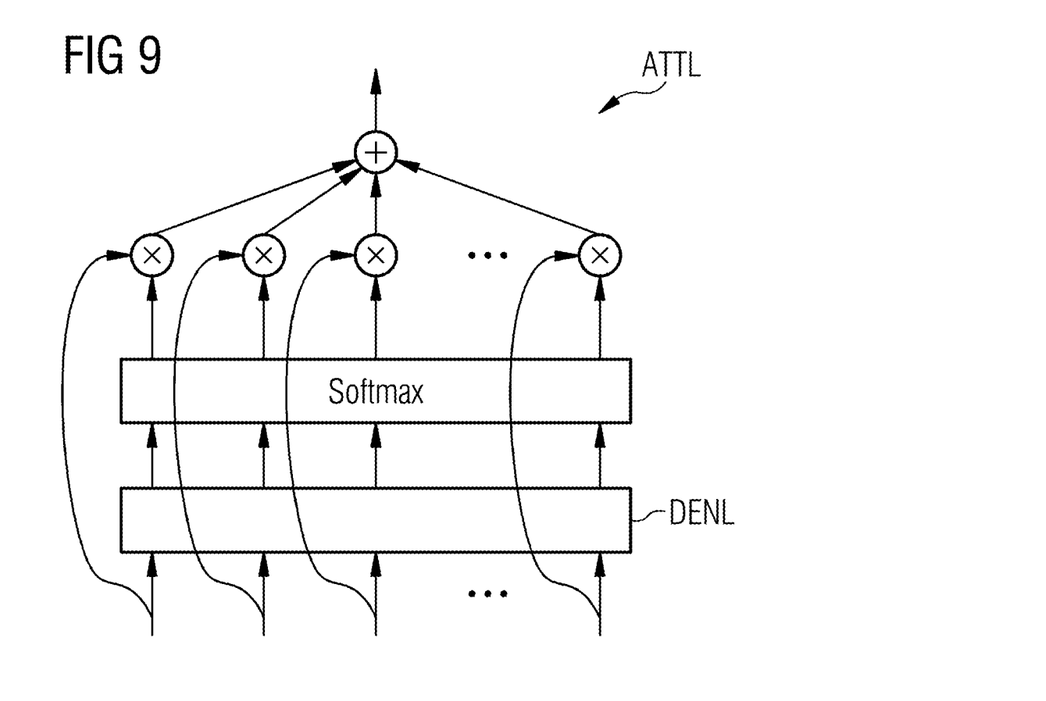
FIG. 9 shows a schematic diagram for illustrating a possible exemplary embodiment of an attention layer implemented in the categorization model illustrated in FIG. 4.

The categorization model CAT-MOD as shown in FIG. 4 includes an attention layer ATTL connected to the output of the last bidirectional GRU layer. The attention layer ATTL can be used to put attention to specific words within the processed sentence s. More important words get a higher value whereas less important words within the sentence s have values close to zero or being zero. A possible implementation of an attention layer ATTL is illustrated in FIG. 9.

The output vector of the bidirectional GRU layer is applied to the attention layer ATTL of the categorization model CAT-MOD as shown in FIG. 4.

Figure 10:
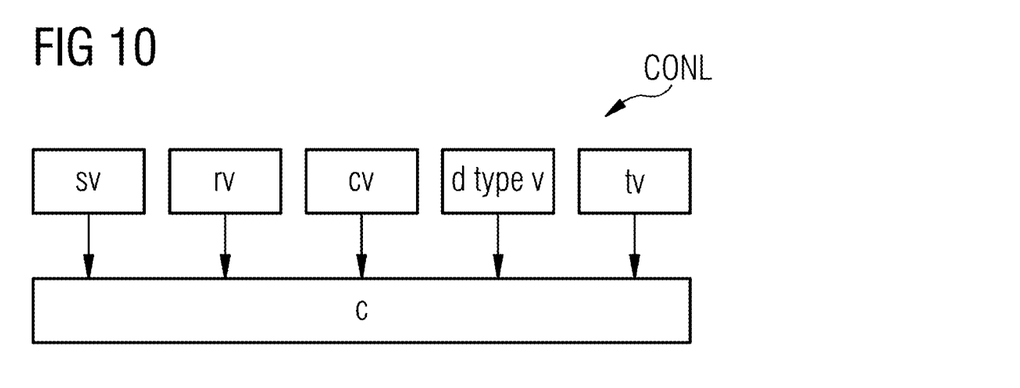
FIG. 10 shows a schematic diagram for illustrating a concatenation layer implemented in the opinion prediction model and in the sub-categorization model illustrated in FIG. 5.

As can be seen in FIGS. 4 and 5, both in the categorization model CAT-MOD and in the opinion prediction model OP-MOD, sub-categorization model SUBCAT-MOD the embedded vectors e calculated by the embedding layers EMBL associated with the input layers INPL for the document-related meta information are concatenated by a first concatenation layer CONL1 to provide a first concatenation vector $c_1$ applied to a following dropout layer DOL provided to reduce overfitting. The concatenation layer CONL can be used to concatenate a list of predetermined inputs as also illustrated schematically in FIG. 10. The list of inputs can include for instance a sentence value sv, a region value rv, a country value cv, a document type value dtypev, and/or a technology value tv concatenated by the concatenation layer CONL to provide a vector c encompassing all values. In the dropout layer DOL, a dropout can be applied to the input values. The selected inputs can be set to a value 0 in a training run. The number of selected inputs can be defined as a fraction rate. Dropout layers DOL can be used to reduce overfitting in the model by preventing complex co-adaptions on training data. The term dropout refers to dropping out units (both hidden and visible) in the model or neural network.

The embedded vectors e calculated by the embedding layers EMBL associated with the input layers INPL for the document-related meta information or meta data and are concatenated by the first concatenation layer CONL1 to provide the first concatenation vector $c_1$ supplied to a dropout layer DOL to reduce overfitting.

Figure 11:
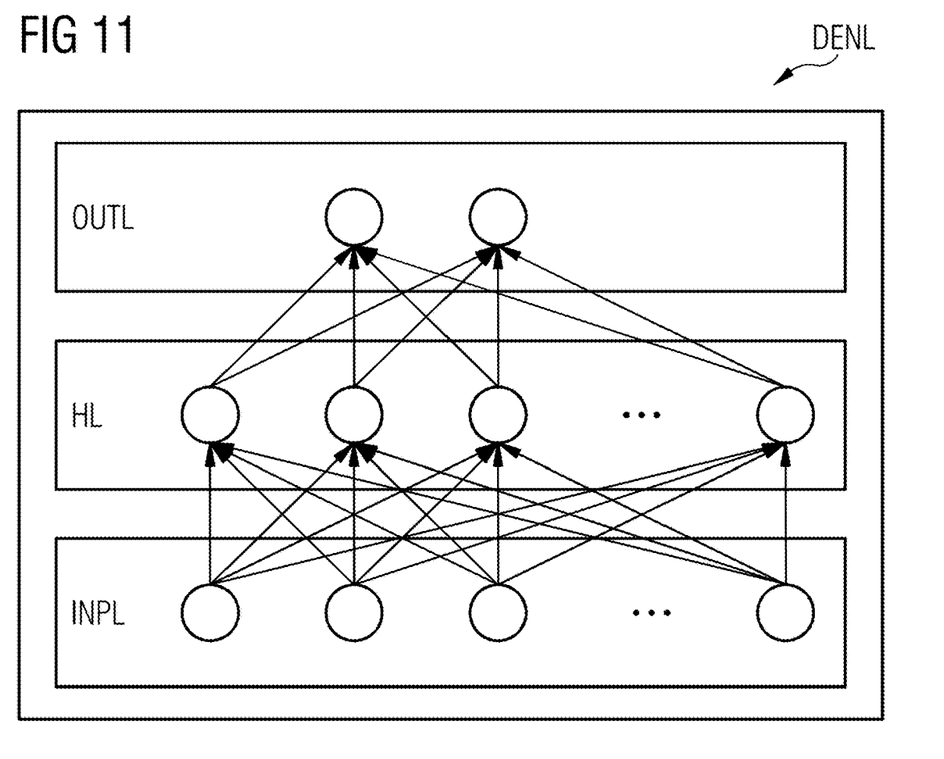
FIG. 11 shows a schematic diagram for illustrating a dense layer as implemented in the categorization model illustrated in FIG. 4 and in the opinion prediction model illustrated in FIG. 5.

As can be seen in FIG. 4 in the categorization model CAT-MOD, the output vector of the attention layer ATTL and the output vector of the dropout layer DOL of the categorization model are concatenated by a second concatenation layer CONL2 of the categorization model CAT-MOD to provide a second concatenation vector $c_2$ which is supplied to a dense layer DENL of the categorization model CAT-MOD connected to an activation layer ACTL which can apply an activation function to the output of the dense layer DENL to calculate the categorization predication result CAT-PR. For multi-class problems, the activation layer ACTL can use a softmax function. A softmax function normalizes the input into a probability distribution. The dense layer DENL connected to the second concatenation layer CONL2 of the categorization model CAT-MOD of the opinion prediction model OP-MOD can include a structure as illustrated in FIG. 11. The dense layer DENL includes densely connected neural network layers as shown in FIG. 11. a dot product is created from the internal (kernel) value and the input value. The dense layer DENL includes an input layer INPL, an output layer OUTL and at least one hidden layer HL.

As illustrated in FIG. 5, the opinion prediction model OP-MOD/sub-categorization model SUBCAT-MOD also includes a bidirectional gated recurrent unit GRU layer GRUL including gated recurrent units GRUs to provide a vector concatenated by a second concatenation layer CONL2 of the opinion prediction model OP-MOD/sub-categorization model SUBCAT-MOD to provide a second concatenated vector $c_2$ which is supplied to a dense layer DENL of the opinion prediction model OP-MOD/sub-categorization model SUBCAT-MOD connected to a following activation layer ATTL which can apply an activation function to the output of the dense layer DENL to calculate the opinion prediction result OP-PR or sub-categorization result SUBCAT-PR for the respective sentence s. The categorization model CAT-MOD as illustrated in FIG. 4 and the opinion prediction model OP-MOD/sub-categorization model SUBCAT-MOD as illustrated in FIG. 5 can be implemented in the prediction module 4 of the artificial intelligence system 1 and can be trained on training data in a training process. In a further possible embodiment, the categorization predication results CAT-PR output by the categorization model CAT-MOD shown in FIG. 4 for the different sentences s of the processed document D and the opinion prediction result OP-PR output by the opinion prediction model OP-MOD can be further processed to analyze the respective document D. Processing of the categorization predication results CAT-PR and the opinion prediction results OP-PR can be performed by an analyzing module of the artificial intelligence system 1 which can be integrated in the prediction model 4 or in the frontend 2 of the artificial intelligence system 1.

In a further alternative embodiment, an analyzing module can also be implemented in the user terminal 5 of the artificial intelligence system 1. The frontend application can provide meta data in an "ann.json" format and text data in HTML. Accordingly, raw data can include meta data md and text as illustrated in the following example.

```
Meta data
{
        "metas": {
           "m_24": { "value": "Americas" }
        }
}
Text data
<html>
     <body>
        <article>
           <section data-type="">
              <div class="content"><pre id="s1v1">... The estimated Contingency represents approximately 4.6 percent of the EPC contract costs. ...</pre></div>
           </section>
        </article>
     </body>
</html>
```

In the illustrated example the document D includes a sentence s such as "the estimated contingency represents approximately 4.6 percent of the EPC contract costs." The input sentence s includes as meta data md region value rv "America". In the document D the text data as illustrated above can be processed by a computer-implemented method within an artificial intelligence system 1 performing the following main processing acts as shown in the flow chart of FIG. 12.

Figure 12:
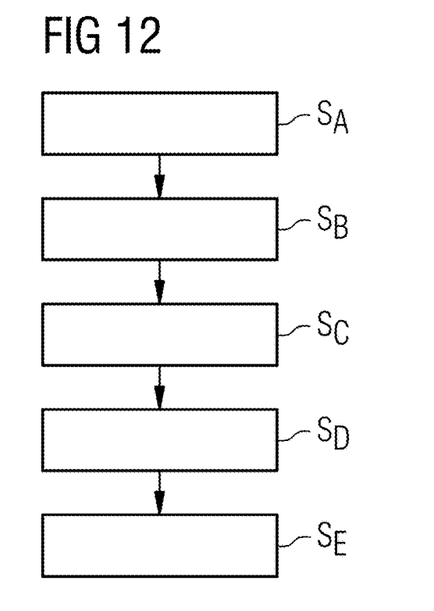
FIG. 12 shows a flowchart of a possible exemplary embodiment of a computer-implemented method for analyzing documents.

In an act $S_A$, the document, (e.g., the raw data), can be uploaded via a frontend and stored at least temporarily in the database 3 of the artificial intelligence system 1. Meta data including document-related meta information md can be added to the raw data. Added meta data md can for instance include document-related information including a document type, a technology type and/or a region such as "America".

In a further act $S_B$, a document D retrieved from the database is preprocessed. Text preprocessing can be performed by splitting the document D into individual sentences s and performing additional preprocessing operations. After having performed the text preprocessing, the original input sentence s can be transformed to "the estimated contingency represents percent_token of the epc contract costs". The processed text can then be converted into an index vector w such as [1, 923, 2662, 1829, 9, 2, 1, 745,166, 204]. For instance, the index "1" represents the word "the" in the preprocessed sentence. By the embedding layer EMBL, the index-based vector can be transformed to an embedded vector e such as [[0.10961, . . . , 0.10222], [0.11263, . . . , −0.1107], . . . , [0.011065, . . . , 0.070734]]. The meta information, e.g., "America" can also be converted to an index such as "1" and then be embedded to "0.061894". By using the trained categorization model CAT-MOD and the trained opinion prediction model OP-MOD, the prediction result (e.g., one per category) can be achieved by internal calculation.

Each sentence s is assessed in an act Sc using the trained categorization model CAT-MOD. For the positive categorized sentences, a sub-categorization model SUBCAT-MOD and the opinion prediction model OP-MOD is applied. The index word vector w representing the sentence is first processed to provide the categorization prediction result CAT-PR.

For each positive categorized sentence, its word vector w is then applied to the sub-categorization model SUBCAT-MOD and to the separate opinion predicters model OP-MOD to calculate a sub-categorization predication result SUBCAT-PR and an opinion prediction result OP-PR in act $S_D$.

Finally, in an optional act $S_E$, the whole document D can be further analyzed by evaluating the categorization predication results CAT-PRs and opinion prediction results OP-PRs. This can take place in a semi- or fully automated manner. The prediction result can be for instance: [0.01, 0.14, 0.05, 0.11, 0.21, 0.02, 0.31, 0.15]. In a possible act, the category position with the highest value (Argmax) can be found. In this case, the $7^{th}$ category having highest value of 0.31. In an additional act, the category prediction index can be converted to a category label such as "Construction_EPC".

Figure 13:
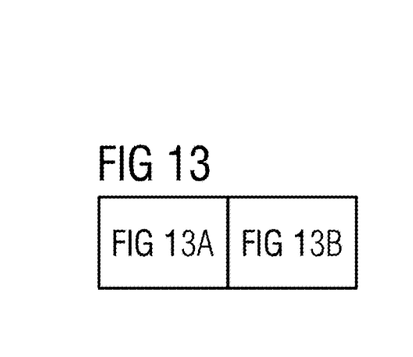
FIG. 13 shows a table (in FIGS. 13A and 13B) for illustrating an exemplary use case with documents of different document types.
Figure 13A:
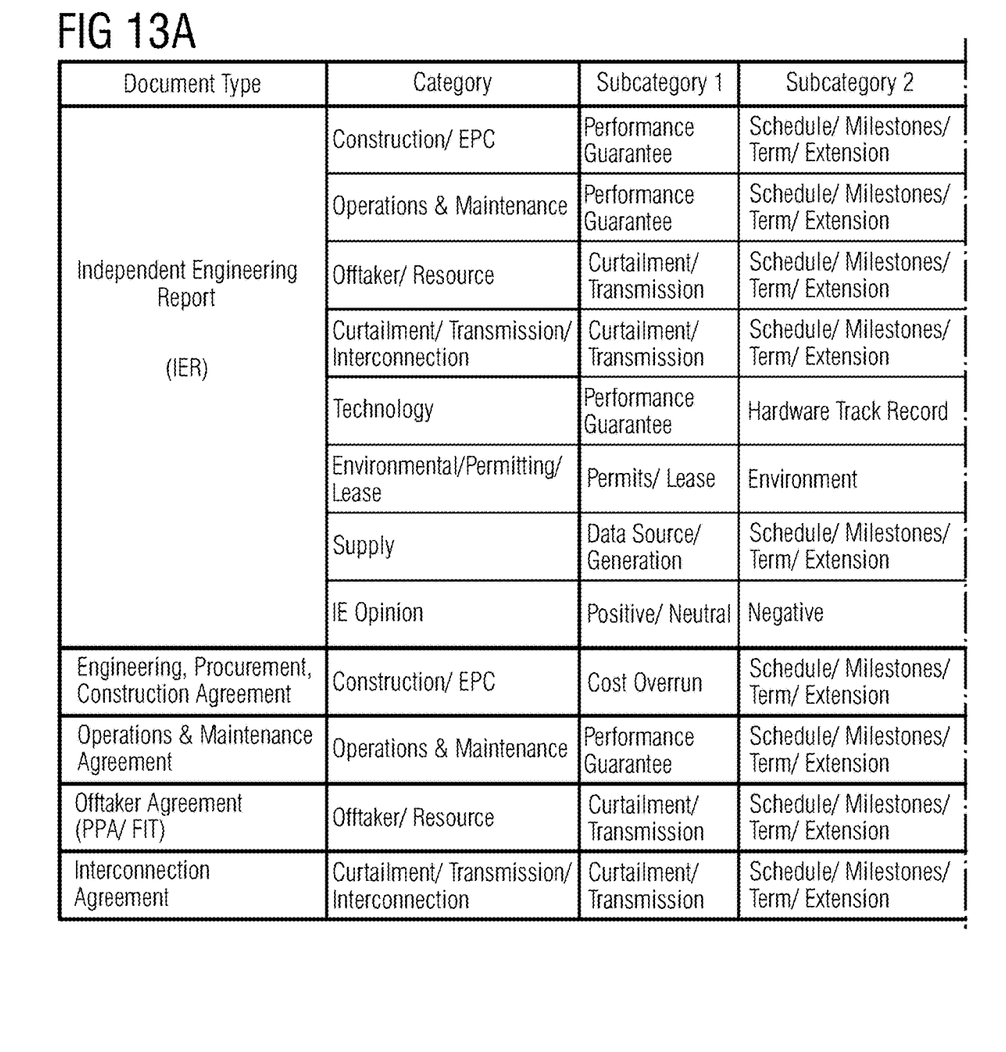
Figure 13B:
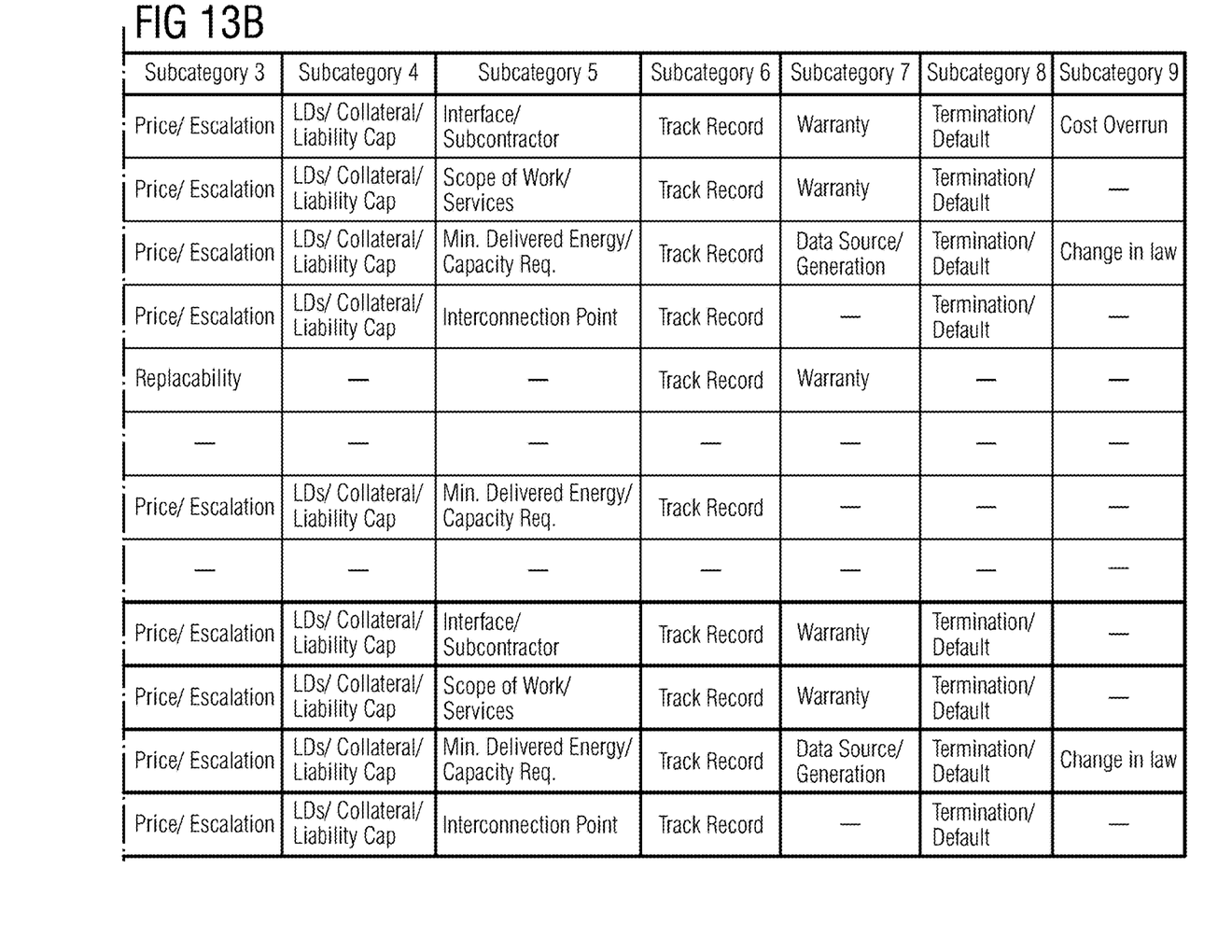

FIG. 13 shows a table (in FIGS. 13A and 13B) illustrating different categories and sub-categories for different document types. As illustrated by the above-given example each sentence s such as "the estimated contingency represents approximately 4.6 percent of the EPC contract costs" can be assessed by using a categorization model CAT-MOD as illustrated in FIG. 4 and sub-categorization models SUB-CAT-MODs as illustrated in FIG. 5 processing a calculated preprocessed word vector w representing the respective sentence s to provide a categorized predication result CAT-PR. A positive categorized sentence s can then be used in act $S_D$ to calculate a sub-category prediction result SUBCAT-PR based on the sub-category prediction model SUBCAT-MOD and an opinion prediction result OP-PR based on an opinion prediction model OP-MOD of the artificial intelligence system 1 as illustrated for example in FIG. 5. Finally, the document D can be further analyzed and/or filtered by evaluating by evaluating the categorization predication results CAT-PR, the sub-categorization predication results SUBCAT-PR and/or the opinion prediction results OP-PR provided by the categorization models and the opinion prediction model.

Prediction results PR can be combined with the meta data and in "ann.json" and can then be uploaded to the frontend application implemented on the frontend server 2.

In the following, the result data of the above-given example is shown:

```
Result data
{
    "metas": {
        "m_24": { "value": "Americas" }
    },
    "entities": [{
        "classId": "e_19",
        "part": "s1v1",
        "offsets": [{
            "start": 155,      This is the prediction
            "text": "The estimated Contingency represents
approximately 4.6 percent of the EPC contract costs."
        }]
    }]
}
```

The field "classID" application is internally mapped to construction_EPC. The computer-implemented method and system provide a highly automated analysis of a plurality of different documents D of different document types thus reducing the required time for performing analysis of a system or project significantly. Moreover, the computer-implemented method and system provide for more objective results concerning the investigated system or project.

The computer-implemented method can be performed by a software tool executable on a platform, in particular, cloud platform. The software tool can be loaded and run in a due diligence framework to assist a user in a due diligence process. The software tool can be loaded from a database or computer program product such as a data carrier.

The disclosure is not restricted to the above illustrated embodiments, but variations can be derived by a man skilled in the art without deviation from the scope of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A computer-implemented method used for analyzing documents by an artificial intelligence system, the method comprising:
    uploading at least one document via a frontend which stores the document in a database of the artificial intelligence system;
    preprocessing the at least one document retrieved from the database by splitting the document into individual sentences and calculating a word vector for each sentence of the document;
    assessing each sentence using a categorization model of the artificial intelligence system by processing the calculated word vector representing the sentence to provide a categorization prediction result; and
    processing positive categorized sentences in order to calculate an opinion prediction result and a sub-categorization prediction result for each positive categorized sentence based on an opinion prediction model and based on a sub-categorization model of the artificial intelligence system.

2. The computer-implemented method of claim 1, wherein the document is analyzed by evaluating the categorization predication results, the sub-categorization prediction results, and the opinion prediction results of the positive categorized sentences.

3. The computer-implemented method of claim 1 wherein meta data is added to text data of the document during the upload of the document.

4. The computer-implemented method of claim 3, wherein the added meta data comprises document-related concatenated meta information.

5. The computer-implemented method of claim 1, wherein a prediction application programming interface (API) is triggered by the frontend to calculate the categorization prediction result, the sub-categorization prediction result, and the opinion prediction result for each positive categorized sentence of the document falling into relevant categories and/or sub-categories where an opinion is requested.

6. The computer-implemented method of claim 5, wherein text data and added meta data are loaded into the prediction application programming interface (API).

7. The computer-implemented method of claim 1, wherein the categorization prediction results, the sub-categorization prediction results, and the opinion prediction results are stored in the database or a local memory of the artificial intelligence system.

8. The computer-implemented method of claim 1, wherein the categorization model, the sub-categorization model, and the opinion prediction model comprise a first input layer to receive the calculated word vector of the sentence and a second input layer for any added document-related meta information, wherein the categorization model comprises, for each input layer, an associated embedding layer, which maps input data of a respective input layer to provide an embedded vector.

9. The computer-implemented method of claim 8, wherein the categorization model comprises a layer normalization layer, which normalizes the embedded vector calculated by the embedded layer associated with each input layer receiving the word vector of the sentence across its features.

10. The computer-implemented method of claim 9, wherein the categorization model comprises a bidirectional gated recurrent unit layer comprising gated recurrent units connected to the layer normalization layer to provide a vector applied to an attention layer of the categorization model.

11. The computer-implemented method of claim 8, wherein, in the categorization model, the sub-categorization model, and the opinion prediction model, the embedded vectors calculated by the embedding layers associated with each input layer for the document-related meta information are concatenated by a first concatenation layer to provide a first concatenation vector supplied to a dropout layer to reduce overfitting.

12. The computer-implemented method of claim 11, wherein, in the categorization model, an output vector of an attention layer and an output vector of the dropout layer of the categorization model are concatenated by a second concatenation layer of the categorization model to provide a second concatenation vector, which is supplied to a dense layer of the categorization model connected to an activation layer, which applies an activation function to an output of the dense layer to calculate the categorization prediction result.

13. The computer-implemented method of claim 10, wherein, in the categorization model, an output vector of the attention layer and an output vector of a dropout layer of the categorization model are concatenated by a second concatenation layer of the categorization model to provide a second concatenation vector, which is supplied to a dense layer of the categorization model connected to an activation layer, which applies an activation function to an output of the dense layer to calculate the categorization prediction result.

14. The computer-implemented method of claim 8, wherein the opinion prediction model and the sub-categorization model comprise a bidirectional gated recurrent unit layer comprising gated recurrent units to provide a vector concatenated by a second concatenation layer of the opinion prediction model and of the sub-categorization model to provide a second concatenated vector, which is supplied to a dense layer of the opinion prediction model or of the sub-categorization model connected to an activation layer, which applies an activation function to an output of the dense layer to calculate the opinion prediction result and/or the sub-categorization prediction result for the respective sentence.

15. The computer-implemented method of claim 1, wherein a positive categorized sentence is annotated based on the calculated categorization prediction result and/or the sub-categorization prediction result and output in annotated form via a user interface of the artificial intelligence system.

16. The computer-implemented method of claim 1, wherein the categorization model, the sub-categorization model, and the opinion prediction model are trained in a machine learning process.

17. An artificial intelligence system comprising:
a frontend configured to upload at least one document and to store the at least one document in a database of the artificial intelligence system; and
a prediction module configured to:
preprocess the at least one document retrieved from the database of the artificial intelligence system by splitting the retrieved document into individual sentences and to calculate a word vector for each sentence of the document;
assess the sentence using a categorization model of the artificial intelligence system by processing the calculated word vector representing the sentence to provide a categorization prediction result; and
process positive categorized sentences in order to calculate an opinion prediction result and a sub-categorization prediction result for each positive categorized sentence based on an opinion prediction model and based on a separate sub-categorization model of the artificial intelligence system.

18. The artificial intelligence system of claim 17, further comprising:
a user interface configured to output the positive categorized sentences of the document in annotated form.

* * * * *